(12) United States Patent
Geerds

(10) Patent No.: US 10,237,455 B2
(45) Date of Patent: Mar. 19, 2019

(54) CAMERA SYSTEM

(71) Applicant: Joergen Geerds, Astoria, NY (US)

(72) Inventor: Joergen Geerds, Astoria, NY (US)

( * ) Notice: Subject to any disclaimer, the term of this patent is extended or adjusted under 35 U.S.C. 154(b) by 0 days.

(21) Appl. No.: 15/477,108

(22) Filed: Apr. 2, 2017

(65) Prior Publication Data

US 2017/0302828 A1    Oct. 19, 2017

Related U.S. Application Data

(63) Continuation of application No. 15/338,826, filed on Oct. 31, 2016, now Pat. No. 9,621,770, which is a continuation of application No. 15/220,726, filed on Jul. 27, 2016, now Pat. No. 9,491,339, which is a continuation of application No. 14/211,678, filed on Mar. 14, 2014, now Pat. No. 9,413,930.

(60) Provisional application No. 61/781,381, filed on Mar. 14, 2013.

(51) Int. Cl.
*H04N 5/00* (2011.01)
*H04N 5/225* (2006.01)
*H04N 5/232* (2006.01)

(52) U.S. Cl.
CPC ......... *H04N 5/2252* (2013.01); *H04N 5/2253* (2013.01); *H04N 5/23238* (2013.01)

(58) Field of Classification Search
CPC ..................... H04N 5/2252; H04N 5/2253
See application file for complete search history.

(56) References Cited

U.S. PATENT DOCUMENTS

| | | | | |
|---|---|---|---|---|
| 4,214,821 A | * | 7/1980 | Termes | G03B 15/00 352/69 |
| 5,023,725 A | * | 6/1991 | McCutchen | G03B 37/04 348/264 |
| 2008/0007617 A1 | * | 1/2008 | Ritchey | H04N 7/18 348/37 |
| 2014/0153916 A1 | * | 6/2014 | Kintner | G03B 17/561 396/419 |

* cited by examiner

*Primary Examiner* — Jeffery A Williams
(74) *Attorney, Agent, or Firm* — Alleman Hall Creasman & Tuttle LLP

(57) ABSTRACT

A camera system includes a camera mounting frame having a plurality of camera mounts. Each camera mount is configured to hold a respective camera at a respective lens orientation such that mounted cameras provide different respective lens orientations relative to each other, with each mounted camera providing a different field of view facing outward from the mounting frame. The camera system may provide obstruction-free, fully spherical image and video capture to record spherical images or spherical videos in which the nadir hole and/or a physical support element of the camera system is eliminated or reduced in size during the digital stitching process of the image or video.

13 Claims, 11 Drawing Sheets

CAMERA SYSTEM

CROSS REFERENCE TO RELATED APPLICATIONS

The present application is a continuation application that claims priority to and the benefit of U.S. patent application Ser. No. 15/338,826, titled CAMERA SYSTEM, filed Oct. 31, 2016, issuing as U.S. Pat. No. 9,621,770, which is a continuation application that claims priority to and the benefit of U.S. patent application Ser. No. 15/220,726, titled CAMERA SYSTEM, filed Jul. 27, 2016, issued as U.S. Pat. No. 9,491,339, which is a continuation application that claims priority to and the benefit of U.S. patent application Ser. No. 14/211,678, titled CAMERA SYSTEM, filed Mar. 14, 2014, issued as U.S. Pat. No. 9,413,930, which is a non-provisional application that claims priority to and the benefit of U.S. provisional patent application No. 61/781,381, titled CAMERA SYSTEM, filed Mar. 14, 2013. These priority applications are incorporated herein by reference in their entirety for all purposes.

BACKGROUND

In recent years, spherical imaging, sometimes called Virtual reality, or VR photography, developed from still to moving images, and is now known as spherical video or 360 video. Panoramic video capture devices with more than 2 sensors on the market, such as e.g., LadyBug by Point Grey and the Dodeca by Immersive Media capture only an extended hemisphere around the camera, leaving a blind spot where a support element, such as a pole supports the panoramic video capture device.

SUMMARY

A disclosed camera system includes a camera mounting frame having a plurality of camera mounts. Each camera mount is configured to hold a respective camera at a respective lens orientation such that mounted cameras provide different respective lens orientations relative to each other, with each mounted camera providing a different field of view facing outward from the mounting frame.

The camera system may further include a support mount that is configured to interface with a support element. In one example, the support mount may be affixed to or integrated with the mounting frame at or near an equidistant location from three or more respective lens centers of three or more adjacent mounted cameras. Alternatively or additionally, the support mount may be affixed to or integrated with the mounting frame at or near a location contained within a region defined by an intersection of three or more different respective field of views of the three or more adjacent mounted cameras.

The camera system may further include a support element coupled to the mounting frame and projecting outward from the mounting frame at an orientation that passes through an intersection of the different field of views of the three or more adjacent mounted cameras. For example, the support element may include a rigid support structure or a tensioned support cable.

The camera system may further include a set of cameras containing three or more cameras mounted to the camera mounting frame at the different respective lens orientations relative to each other, with each mounted camera of the set of cameras providing a different field of view facing outward from the camera mounting frame. In some configurations, the set of cameras may contain three or more, four or more, five or more, or six or more cameras, and the camera mounting system may include a corresponding number of camera mounts.

It will be appreciated that the above summary describes only some of the concepts covered in greater detail in the following detailed description. As such, claimed subject matter, now or later presented, is not limited to the contents of this summary.

DETAILED DESCRIPTION

Figure 1:
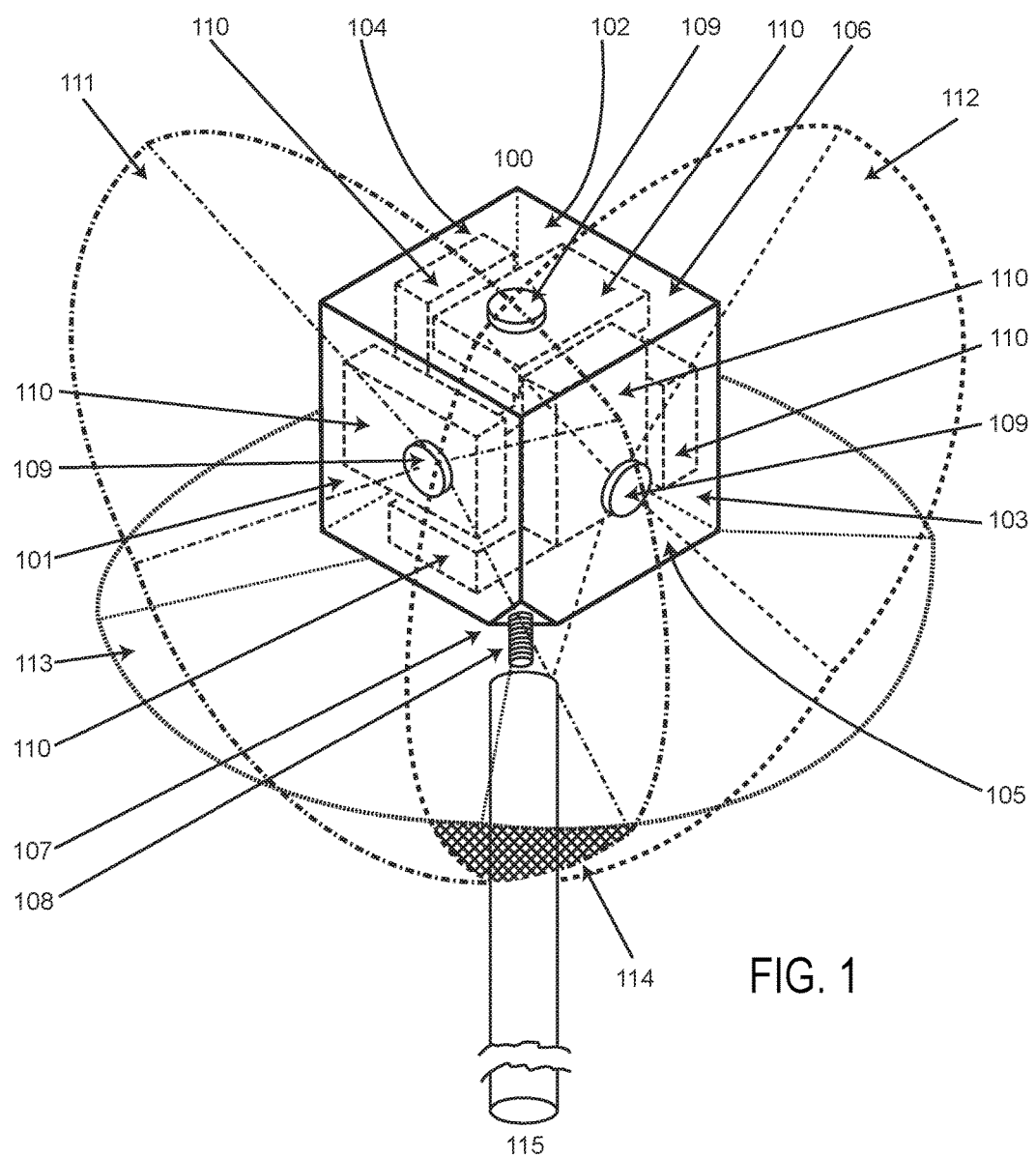
FIG. 1 is an illustration of an embodiment of the disclosed camera system where the mounting frame is a cubic enclosure and the mount is placed at a corner of the cube and pointing outward. Also shown is the field of view of the three lenses adjacent to the corner mount and their intersections.

A disclosed camera system includes a camera mounting frame having a plurality of camera mounts. Each camera mount is configured to hold a respective camera at a respective lens orientation such that mounted cameras provide different respective lens orientations relative to each other, with each mounted camera providing a different field of view facing outward from the mounting frame. The camera mounting frame may take the form of a polyhedron in at least some configurations.

The camera system may include a support mount that is configured to interface with a support element. In one example, the support mount may be affixed to or integrated with the mounting frame at or near an equidistant location from three or more respective lens centers of three or more adjacent mounted cameras. Alternatively or additionally, the support mount may be affixed to or integrated with the mounting frame at or near a location contained within a region defined by an intersection of three or more different respective field of views of the three or more adjacent mounted cameras.

The camera system may include a support element coupled to the mounting frame and projecting outward from the mounting frame at an orientation that passes through an intersection of the different field of views of the three or more adjacent mounted cameras. For example, the support element may include a rigid support structure (e.g., an elongate pole) or a tensioned support cable. The support element may be integrated with the camera mounting system or may be removably secured to the camera mounting system by the support mount. The support mount and/or the support element may be oriented along and project outward from the camera mounting frame along the weighted or unweighted average of the surface normals (e.g., lens orientations) of adjacent faces (e.g., faces that are orthogonal to an axis of the lens orientation passing through the lens centers) of three or more of the mounted cameras (e.g., adjacently mounted cameras).

The camera system may include a set of cameras containing three or more cameras mounted to the camera mounting frame at the different respective lens orientations relative to each other. In at least some configurations, each mounted camera of the set of cameras provides a different field of view facing outward from the camera mounting frame. In some configurations, the set of cameras may contain three or more, four or more, five or more, or six or more cameras, and the camera mounting system may include a corresponding number of camera mounts. These cameras may include any suitable static photography camera and/or dynamic video camera.

The disclosed camera system is generally applicable to the technical field of video and photography. Particularly, the disclosed camera system is applicable to the technical field of panoramic video and panoramic photography. More particularly, the disclosed camera system is applicable to the technical field of fully spherical or 360 video and photography. In at least some implementations, the disclosed camera system minimizes, reduces, and/or eliminates blind spots resulting from the presence of a support element used to support a panoramic or spherical camera system.

In recent years, spherical imaging, sometimes called Virtual reality, or VR photography, developed from still to moving images and is now known as spherical video or 360 video. Panoramic video capture devices with more than 2 sensors on the market, such as e.g., LadyBug by Point Grey and the Dodeca by Immersive Media capture only an extended hemisphere around the camera (e.g., 360 degrees around, covering the zenith fully), but leaving a blind spot downwards where the camera mount pole is located. These panoramic video capture devices are unable to capture the nadir of the sphere. In other words, they are able to capture e.g., 360×150 degrees (almost full sphere), but not 360×180 degrees (full sphere). The Google streetview imaging system (which is based on the Dodeca) is a well known system in this context.

One example for a fully spherical, single trigger, photo camera system is a concept piece by researchers of the Technische Universität in Berlin, Germany in 2010. This device resembled a soccer ball with embedded cameras (normal lenses and sensors as found in mobile phones), which would be thrown up in the air to take a panoramic picture by triggering all cameras at the apex (see e.g., Jonas Pfeil, Germany, Ballkamera—ball cam).

Using multiple cameras and multiple lenses typically requires the individual cameras be triggered at the same time, the white balance should be roughly the same, the exposures should typically be within the capability and range of the recording sensors, and the individual field of views of each lens typically should have sufficient overlap, in order to be able to combine (e.g., "stitch") the visual material into a larger video or image with the desired 360 degree view. Using multiple cameras also allows to work around the current recording sensors, which are limited in the amount of data and pixels they can process, by splitting the task to several lenses, sensors, and the attached image processor. This can result in a much higher resolution than what a single sensor system can achieve, although the processing requirements to stitch this massive amount of data is still challenging.

Around the year 2010, GoPro (Woodman Labs, Inc.) brought a popular small camera to the market that featured an unusual fisheye lens, geared towards surfers and snowboarders, and related outdoor sports activities. The international panoramic photography community immediately picked up on those cameras and started developing what could be best described as "5 cameras on a stick", to create a recording system that resembles a professional system (e.g., the Ladybug system from Point Grey), at a fraction of the cost and weight. Throughout the years 2011 and 2012, this 5-around configuration was very popular, especially among RC drone pilots.

One common disadvantage of the various approaches mentioned above is the so called nadir hole in the direction where the camera system is mounted. Depending on implementation, the size of the hole typically varies (e.g., between 20 and 60 degrees) and it was generally considered that there is nothing worth filming in that direction. Hence, many commercial efforts were not focused on resolving the issue. The nadir hole problem also limits the use of those systems to a strictly vertical orientation (either a top or a bottom mount). Off-axis recording results in a wobbling horizon line in the final 360 (e.g., the location of the nadir hole).

Another drawback with at least some of these various approach is that the orientation of the cameras in relationship to the system is parallel or perpendicular to the ground limiting the field of view in the vertical direction. Luca Vascon (Venice, Italy) was one of the few that recognized the potential of turning the camera and thereby the sensor in the camera by 30 degrees to its diagonal (relative to the optical axis of the lens). Luca Vascon developed a rig for 3 DSLR cameras, for simultaneous shooting, in collaboration with Agnos S.a.a, Cento, Italy. This system achieved more coverage in the vertical direction than previous solutions. However a disadvantage here is the high cost and the weight of 3 DSLR cameras. In addition, the large distance between the lenses due to the size of an individual DSLR introduces parallax errors into the final video, in addition to the comparatively low resolution of the final panoramic video.

Other commercial solutions such as the LadyBug by Point Grey require that an external recording device such as a laptop is attached to the camera while recording the video making these systems heavy and impractical.

A common denominator of most of these approaches is that the mount (e.g., a tripod) is attached to the bottom of the camera system—e.g., at a "face" of the main geometry, such as the flat bottom of a polyhedron. Many of the existing solutions for spherical video suffer from some or all of the disadvantages such as a nadir hole, high weight, high cost and fixed orientation of the camera system and cameras. While the present disclosure recognizes these disadvantages, it will be understood that the disclosed subject matter is not limited to embodiments or implementations that address any or all of these disadvantages.

In at least some configurations, the disclosed camera system may include or form a corner mounted camera rig. A corner mounted camera rig for obstruction-free, fully spherical image and video capture (e.g., referred to as a "rig" hereafter) makes it possible to record spherical images or spherical videos with a single device or device system, capturing the full, visual sphere without necessarily requiring the moving or rotating of the device or device system. The geometry of the disclosed camera system makes it possible to produce a fully 360 by 180 degrees, spherical image or fully spherical video wherein the nadir hole or any physical support of the rig is eliminated during the digital stitching process of the image or video, resulting in a completely immersive experience. Within this context, a plurality of cameras of the disclosed camera system are oriented at respective lens orientations by the camera mounting system so that those cameras capture sufficient time-aligned image data of respective field of views that can be stitched together at a common instance or sequence of common instances of that time-aligned image data to obtain an image or sequence of images that partially or entirely eliminate the nadir hole or support element(s) that support the camera system.

In at least some configurations, the rig comprises a camera mounting frame able to hold (e.g., receive, retain, mate with, etc.) a plurality of cameras in a polyhedral configuration and a mount (also referred to as a support mount) positioned at or near one of the corners of the polyhedron of the camera configuration that attaches the rig to poles, monopods, tripods, tensioned cables, or other suitable support elements.

The mounting frame refers to the physical support structure for the camera configuration. The mounting frame provides a mounting component for each camera such that each camera can be securely held in place. In one example, the mounting components are arranged in a convex polyhedron such that the lens of an attached camera is pointing outward. The lenses are thought of lying in or protruding the polygonal faces of the polyhedron. Possible configurations of the mounting components making up the mounting frame include but are not limited to a number of convex polyhedra such as a tetrahedron, a cube or various prisms or pyramids. Each polygonal face of the polyhedron may include one or more mounting components.

It will be understood that the disclosed camera system is not limited to physical polyhedron configurations, and camera mounting frames may have spherical or ovoid configurations. However, the polyhedron construct may serve as a useful tool for describing and illustrating the nadir eliminating concepts described herein. For example, polyhedron faces may be described with reference to a virtual surface that is normal to an optical axis or lens orientation of a lens. In such case, a "corner" of the polyhedron may take the form of a virtual corner (as opposed to a physical corner) that corresponds to an intersection of three or more virtual surfaces. As such, it is to be understood that the polyhedron examples may be adapted for spherical or ovoid configurations by a person having ordinary skill in the art in light of the teachings of the present disclosure.

The number of cameras necessary or used to map the full visual sphere depends on the field of view of the lens/cameras used. The larger the field of view, together with the aspect ratio of the recorded material, the less cameras are necessary or may be used. In one construct, the concept of mapping out the full, visual sphere and eliminating or reducing the nadir hole requires a minimum of four cameras. Therefore the mounting frame may include four or more mounting components able to hold one camera each. However the exact number of cameras and therefore the number of mounting components varies and depends on the physical properties of the lenses which are attached to the cameras and the physical size of the cameras.

The camera mounting frame may include one or more frame elements. In one example, the mounting frame includes one main body with a brace for each mounting component to hold a respective camera in place. In another example, each mounting component is a separate frame element. The frame elements may have cutouts for camera cooling, control functions such as memory card slots, displays, control buttons, microphone ports, and battery or power connectors. The frame elements may be connected to each other by, not excluding other means or configurations, screws, self-interlocking snaps, or may be a single piece or material, depending on the cameras intended to be used.

The mounting frame may be a mostly or entirely internal or a mostly or entirely external support for the cameras or a combination of the two. In one example of an external support the mounting components may take the form of flat panels on the outside and the cameras are attached from the inside to the panels with the lens protruding through the panels and sticking above the panel's surface, or imaging through an opening or window of the panels. In one example of an internal support the mounting components are cradles for the cameras. Here, the cradle encloses parts of the sides and the back of the camera and leaves the front of the camera exposed. The individual cradles are attached to each other along the edges and sides and the cameras are secured by braces across the front of the camera. The configuration of the mounting components does not depend on whether the support is mostly internal or mostly external but may depend on intended application.

The mounting frame may also include elements to connect the mounting components to each other and the corner mount and any other part deemed necessary for the intended use of the rig.

Positioned at or near the corner of the polyhedral configuration of the mounting components and pointing outward is the corner mount of the rig. The corner mount connects the mounting frame to a pole, monopod, tripod, tensioned cable, or other suitable support element with which the user can control or support the rig in space. One example of a mount is a threaded stud or bolt that is partially embedded in the material of the mounting frame. Another embodiment can use a female thread, depending on the material used to build the frame. The thread may be a ¼"-20 or ⅜"-16, or other suitable size. These are standard sizes used in photography and video equipment. However, other suitable interfaces may be utilized to secure the camera system to a support element.

In one example, the corner or vertex of the configuration of the mounting frame may correspond to a common point of at least three faces of the polyhedron. The mount is oriented outward along the weighted or unweighted average of the surface normals of the adjacent faces of the polyhedron. However, other suitable combinations beyond averages may be used. Having the mount in this position and orientation a pole, monopod, tripod, cable, etc. attached to the mount is captured by at least three cameras and lies in the intersection of at least three field of views. Since the support element is captured from at least three different angles, the support element can be eliminated, reduced, or minimized by masking during the stitching process leaving a small, barely visible dot, limited to the diameter of the support element, instead of the typically larger nadir hole.

Lenses with large field of view are desirable in the context of the disclosed camera system and fisheye lenses may be a preferable choice. The process of mapping the full, visual sphere may require that or benefit from the field of view of each lens intersects the field of view of all its neighboring lenses and that the whole border of the field of view of each lens is overlaid by parts of the field of views of its neighboring lenses to avoid holes in the finished image or video. Objects close to the edge of the field of view of one lens appear in the field of view of at least one other lens. In the digital stitching process the single images or video streams from each camera are combined into one spherical image or spherical video (e.g., using time-aligned image data obtained from each camera). Features appearing in at least two fields of view are used to align the single images or video streams.

The combination of the corner mount with a fully spherical camera rig enables free orientation of the rig in space simplifying the image and video capture. The final image or video may be fully spherical without a nadir hole. This freedom in capturing the image or video together with a obstruction-free final image or video results in a fully immersive image or video experience.

In a non-limiting example, the preferred cameras for use in conjunction with the rig are lightweight, small, self-contained, high definition (HD) action or sports cameras featuring a wide angle lens. Two examples of companies producing such a camera are GoPro with the Hero 2 or Hero 3 line or Rollei with the Bullet 3S, 4S or 5S series. Any suitable camera may be adapted into a spherical system by the disclosed camera system. A setup with those kind of cameras provides several additional advantages over existing systems such as being overall lightweight and inexpensive. Furthermore the small size of the cameras makes its configurations possible where the cameras are very close together. The relative size, especially the distance of each lens to the so called no-parallax-point (NPP), may be a significant consideration, since the greater the distance from the NPP, the more parallax and consequently stitching errors will be visible in the final spherical video/image. Parallax errors may be unavoidable, but can be kept to a minimum or may be reduced, for example, by minimizing or reducing the NPP distance.

The spherical camera rig with corner mount is a system for fully spherical photography or fully spherical video without a significant nadir blind spot and high resolution output. The corner mount may be positioned at the intersection of the field of view of at least three fisheye or wide-angle lenses so that in the final, processed image or video any attachment to the rig, such as a monopod, tripod, tensioned cable, or other suitable support element, is rendered invisible, reduced, or minimized, and does not appear significantly in the final output, and therefore provides the viewer with a fully immersive experience.

To achieve fully spherical video or image, several cameras are used. As one example, the fisheye or wide-angle lenses of each camera are arranged such that the field of view of each lens intersects with the field of view of the neighboring lenses. The number of cameras or lenses is determined by the field of view of the lenses used, and the aspect ratio of the video or image recorded. 20-30 percent overlap between neighboring cameras is generally considered usable. The disclosed camera system, from here on referred to as the 'rig' covers the full 360×180 degree visual sphere where 360 degree refers to the view around the "equator" and 180 degrees refers to the view from the "north pole" (from here on called zenith) to the "south pole" (from here on referred to as the nadir). The single images or frames from each lens are then combined digitally by aligning features which appear in the overlap region in the images or frames captured from neighboring lenses. This established process is called (panoramic) stitching, and creates a fully spherical or all-around image or video.

The rig with its corner mount allows the mounting pole to be seen from at least 3 cameras, from at least 3 different angles. The background behind the mounting pole is also seen from at least 3 very different angles. This allows the use of a digital masking process during the stitching process in which the mounting support element is rendered invisible, minimized, or reduced. In a non-limiting example, this may be accomplished by replacing the pixels representing the mounting pole in each field of view by background pixels from one of the other cameras. This approach is possible with the inherent parallax stemming from the geometry of the disclosed camera system, which supports multiple cameras having overlapping field of views.

Without the mounting pole visible from multiple camera angles, the resulting image or video will typically show a significant nadir hole, and thus reducing the ability to capture the full sphere and the full immersion. Some care during filming or photographing should be taken, to ensure that any structures supporting the mounting pole or other support element should be visually obscured, since these elements may not be removed from the final output by the masking technique described herein.

FIG. 1 shows an embodiment of a spherical camera with corner mount: 100 is the mounting frame, comprised of six individual panels 101-106, each holding a camera 110 in its designated position and lens orientation within the mounting frame. The panels 101-106 have an opening to allow the lens 109 to image the surrounding environment, protects internal components from the environment, and may contain or support additional components. The support mount 108 is located on (e.g., at or near) the corner 107 of this cube configuration, allowing the rig to be attached to a pole 115 or similar device. The mounting point 108 in this embodiment may include a threaded metal rod (male ¼"-20), a common size in photography, to allow attachment to a pole 115 or similar device, as a non-limiting example. Also suitable is a male ⅜"-16 rod, or, if the material allows, female ¼"-20 or ⅜"-16 tapped into the rig. However, any suitable connection hardware may be utilized.

In a non-limiting example, each of cameras 110 may be identical to each other. Each of the cameras 110 (e.g., digital cameras) are fixed in an 90 degree alternating orientation relative to the next panel, so that the optical centers of each lens 109 are at a minimum distance from the common optical center of the complete rig. The common optical center is also called the no-parallax-point, and the distance of each lens to the no-parallax-point should be kept at a minimum. The larger the distance, the less overlap between adjacent field of views, and the larger the apparent parallax errors in the regions where the field of views of at least two cameras intersect. A lens-lens distance of 15 cm or less will yield satisfactory results, with some parallax errors visible. A lens-lens distance of 10 cm or less is desirable for better results. 111 is the field of view (FoV) of the camera attached to panel 101 depicted by the dot-dashed line, 112 is the FoV for the camera attached to panel 102 depicted by the dashed line, and 113 is the FoV for the camera attached to panel 105 depicted by the dotted line. In one example, the cameras 110 record the video in a 4:3 aspect ratio, and therefore the field of view has a 4:3 ratio as well. In this embodiment, the field of view is about 127×95 degrees. The alternation of the orientation of the cameras allows significant overlap between the adjacent field of views, enough to have at least three fields of view overlap at the corners 114.

Figure 3:
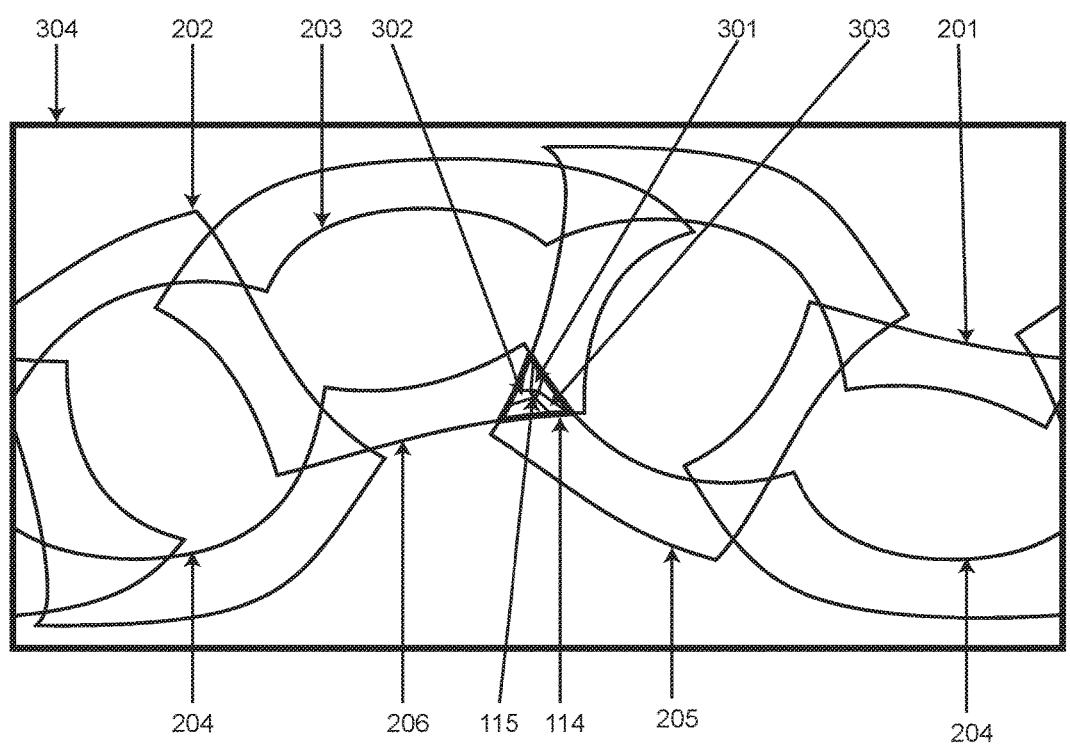
FIG. 3 shows the equirect or flat representation of the fully spherical field of view and the intersection of the field of view of the six lenses in the cubic configuration.

The disclosed camera system may utilize this triple overlap 114 or even greater overlap to eliminate the supporting pole from the final stitched image (see FIG. 3). In this embodiment (cube configuration), eight of those triple overlap regions are present, one at each corner, allowing more than one mounting point to be utilized and integrated, if desired. A non-limiting example of a multi-mount approach is described with reference to FIG. 11 in which a tensioned cable secures the camera mounting system at two opposing sides. An example configuration would have at least one mounting point 108, where other configurations may have multiple mounting points 108.

Figure 2:
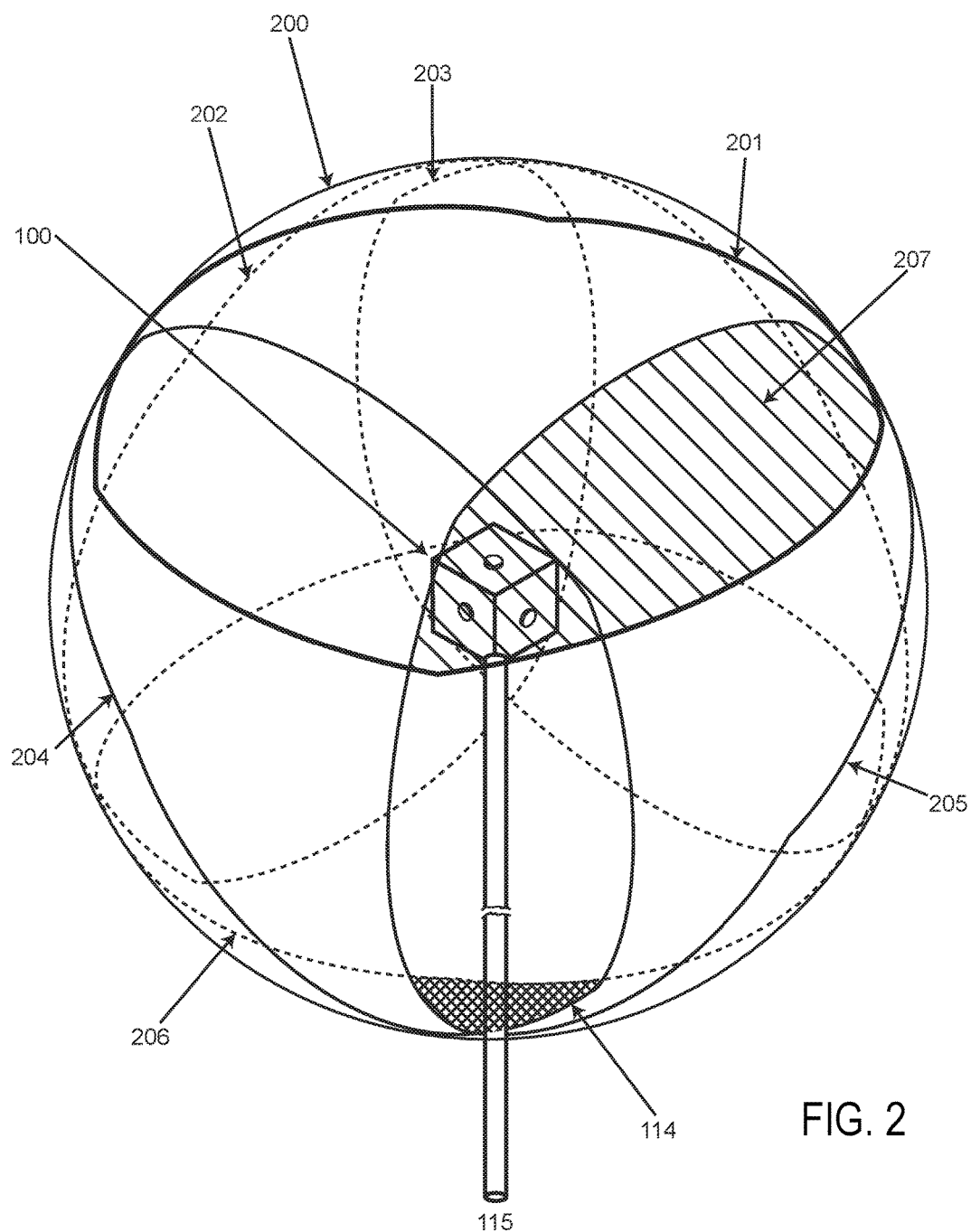
FIG. 2 is an illustration of the visual sphere and a particular embodiment of the disclosed camera system in the cubic configuration. The six areas completely covering the visual sphere and intersecting each other represent the part of the sphere captured by each of the six fisheye lenses.

In FIG. 2 the mounting frame 100 from FIG. 1 is placed inside the visual sphere 200. Mapped on the sphere 200 are six regions 201-206 which mark the intersections of the sphere with the fields of view of the six cameras in the cubic configuration and the cameras recording video in a 4:3 aspect ratio, utilizing the camera sensor completely. The region 201 is the upper cap of the visual sphere 200 with its border extending behind the sphere. Similar region 205 on right side of the sphere 200 extends behind the sphere and region 204 on the left extends on the left behind the sphere. The region 207 is the intersection between region 205 and region 201. Each region intersects with the four adjacent regions as the FoV of each camera intersects with the FoV of the cameras on the adjacent sides. Region 114 is the intersection between the regions 204, 205 and 206. The triple overlap region 114 is recorded by three cameras. The pole 115 (or other suitable support element) attached to the rig lies in this region 114 and is seen from three different angles. This parallax may be considered important to be able to mask the pole 115 and remove it from the final image.

In another example, the cameras may record in a 16:9 aspect ratio. In that case the FoV of the same lenses is about 127×70 degrees. A smaller, narrower region of the sphere 200 is covered by each lens. In this aspect ratio example, six cameras in a cubic configuration do not map the entire sphere 200 and more cameras and lenses in a different configuration are needed. Hence, the disclosed camera system may support more than six cameras to accommodate different aspect ratios.

FIG. 3 shows the sphere 200, reprojected into a equirectangular projection, showing the 360 degree view along the long side, and the 180 degree from "pole to pole" along the short side, in a rectangular format that has a 2:1 ratio. The complete surface of the sphere 200 is represented by 304. The continues surface of the theoretical sphere 200 allows remapping within the equirectangular space, rendering "North Pole", "South Pole", zenith and nadir arbitrary. In FIG. 3, the direction of the pole, in relationship to the rig, has been remapped to be in the center, for illustrative purposes. The fields of view of the six cameras from FIG. 1 are flattened out into the equirectangular space, forming roughly rectangular shapes, showing the 4:3 aspect ratio of the recorded material used. Each camera has overlap with four neighboring cameras: 206 has overlap with 202, 203, 204 and 205, but not 201 since it is on the opposite of 202. A significant overlap may be considered important for video and photo stitching, since it allows the stitching software to choose a wider area to make a seam, and make the transition between those two areas a better blend.

The process of panorama stitching has been established: the software picks matching patterns in the overlap regions between all constituents, creates control points, and uses a polynomial lens correction model to map the previously fisheye-distorted images onto the surface of a perfect sphere. Once the tiles are remapped, the second step of the process is blending them into a final image map. Blending creates an (hopefully) invisible seam, where differences (e.g., exposure, brightness, white balance or differences in features due to parallax) are smoothed out in the transition area. This process has worked well for still panorama photography, and has been adopted for video stitching as well, since videos are nothing but a series of still images. After blending, the series of images are then put together as a movie again, ready for post production. The resulting equirectangular (or any other chosen) projection, can then be viewed on a computer, using a special panoramic viewer. It will be understood that other suitable stitching techniques may be utilized.

As previously mentioned, the pole 115 (or other suitable support element) is visible in 204 as 301, in 205 as 302, and in 206 as 303, representing each time a small, almost triangular shape terminating in the footprint of the pole (or other suitable support element). Due to the different viewing angle from each of those three cameras, the background covered by the pole in one field of view is seen without obstruction by the two others, and simply instructing the blending software used to omit the areas representing the pole 301, 302 and 303 (a.k.a. masking), the blended result will have only a tiny area 115, representing the diameter of the pole, the vanished pole helps with the illusion that the disclosed camera system would "float without support", without major post-production or retouching steps, since the masking process may be already build into the blending software. In some implementations, the area 114 may contain only a tiny smudge, easily blending into the surroundings of 114.

In at least some implementations, an important feature of the rig is that it is mounted on one of the corners instead of a face or edge of the polyhedron. The corner mount of the rig is positioned at one of the corners or vertices of the polyhedral configuration of the mounting components and points outwards from the mounting frame. The direction where the mount is pointing in can be determined by using the normal vectors of the adjacent faces of the polyhedral configuration. The vector pointing in the direction of the corner mount is the vector sum of the normal vectors of the adjacent faces. A weight can be associated with one or more normal vectors which acts as a multiplication factor for the length of the associated normal vector during the vector addition.

Figure 4:
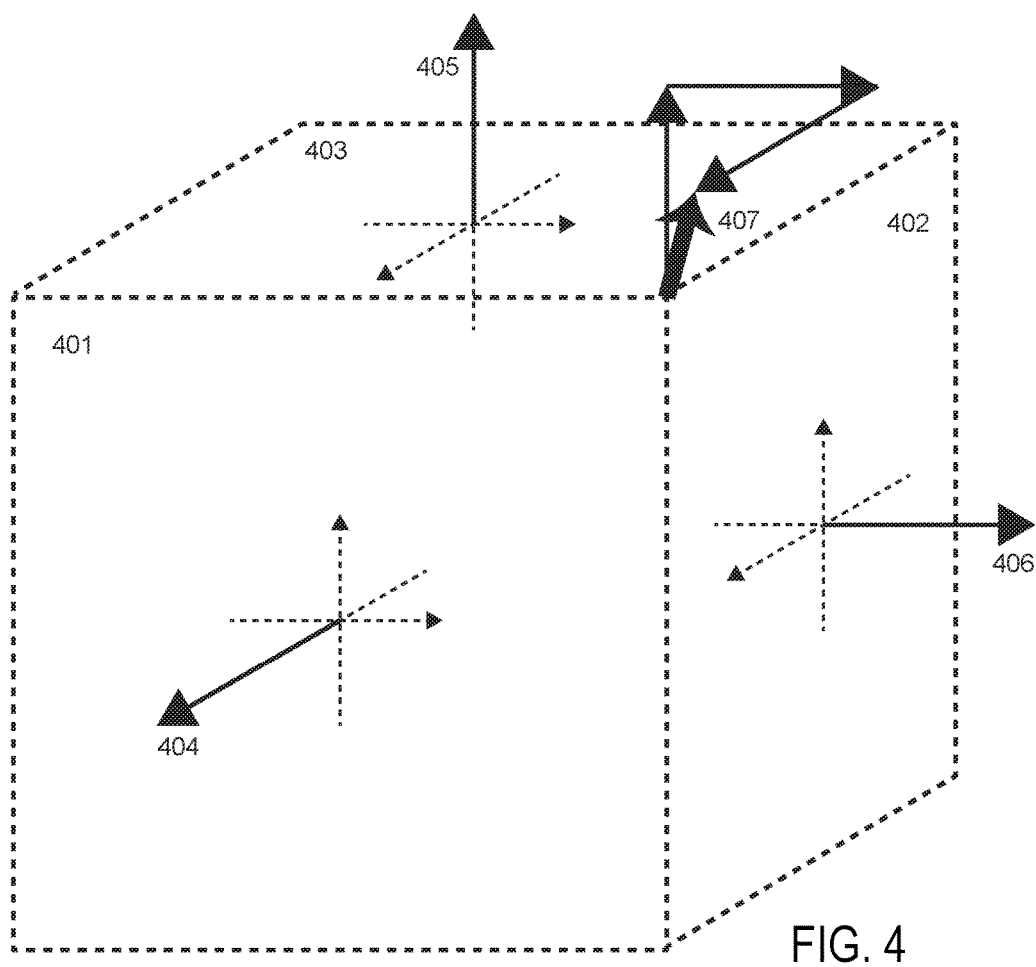
FIG. 4 demonstrates how the direction of the corner mount is determined for the case where the surface normals of the adjacent faces have equal weight.

FIG. 4 illustrates an example for the cubic configuration. The normal vectors 404 is drawn pointing out from the face 401, the normal vector 406 pointing out from the face 402 and the normal vector 405 pointing out from the face 403. The three normal vectors 404, 405 and 406 have equal weight and therefore are drawn to have equal length. Using the parallelogram rule for vector addition the vectors 404, 405 and 406 are summed and the vector diagram is drawn at the corner where the mount attaches. The head of one vector connects to the tail of the next. The resulting vector 407 represents the direction for the corner mount. In the case where the vector normals of the adjacent faces 404, 405 and 406 have equal weight the direction for the corner mount is along the body diagonal of the cube and the angle between the mount and each face 401, 402 and 403 is the same.

Figure 5:
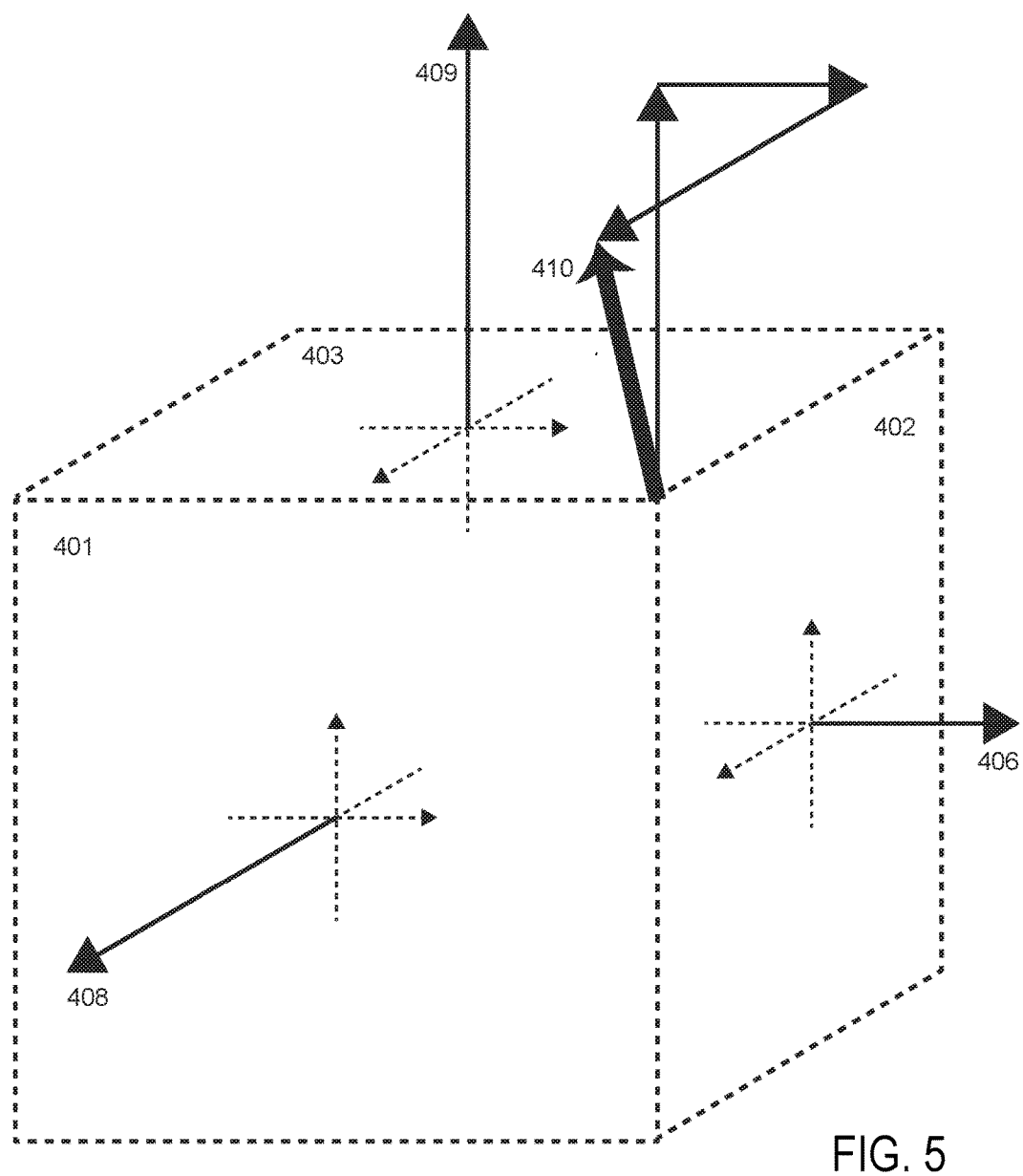
FIG. 5 demonstrates how the direction of the corner mount is determined for the case where the surface normal of the adjacent faces have differing weight.

FIG. 5 shows an example for the cubic configuration where different weights are associated with the normal vectors of the faces 401 and 403. The weight for the normal vector of the face 401 is 1.5. The length of the normal vector of the face 401 is multiplied by 1.5 resulting in the vector 408 pointing out from the face 401. The weight for the normal vector of the face 403 is 2. The length of the normal vector of the face 403 is multiplied by 2 resulting in the vector 409 pointing out from the face 403. The vector diagram for the addition of the vectors 409, 406 and 408 is drawn at the corner where the mount attaches. The resultant vector 410 points in the direction of the corner mount. The angle between the vector 410 and the face 403 is the smallest out of the three since the highest weight was associated with the normal vector of the face 403. The mount tilts more towards the face with higher weight associated and tilts away from the face with the lowest weight associated.

Several non-limiting example configurations of camera systems are depicted in FIGS. 6-11. These example configurations present a sample of possible configurations and are in no way thought to be a complete list. These example configurations were built and demonstrated to work as intended, and the cameras used are mentioned, where appropriate. The main bodies of the rig were rapid-prototyped, using fused-deposition-model 3D printer, with thermoplastics like PLA (polylactic acid) and ABS (acrylonitrile butadiene styrene). Other building materials such as Nylon, aluminum and other metal alloys, or even wood are possible, either with additive printing techniques such as selective-laser-sintering (SLS) or with more traditional methods such as subtractive multi-axis CNC milling. Injection molding may also be utilized, but may require a change of the 3D model used for the previously described manufacturing techniques.

Figure 6:
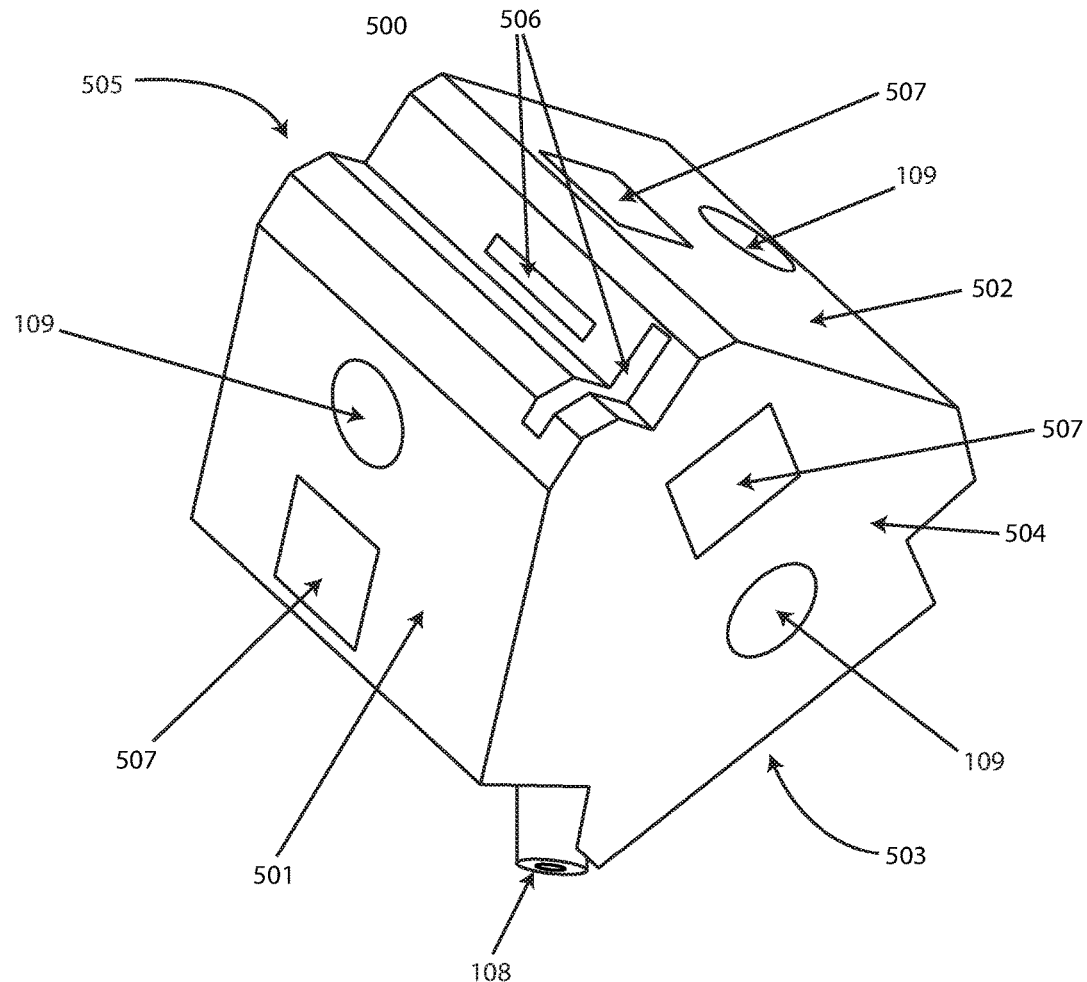
FIG. 6 is an illustration of an embodiment of the disclosed camera system where the mounting frame includes five cradles in a triangular prism configuration and the mount is placed at a corner and pointing outward.

FIG. 6 shows another example of the disclosed camera system. In this particular embodiment the mounting components 501, 502, 503, 504 and 505 are arranged as a triangular prism where the mounting component 504 is the triangular base of the prism, 505 is the triangular top parallel to the base, and 501, 502 and 503 are the three, rectangular faces joining corresponding sides. This configuration is also referred to as three around, one up and one down. Each mounting component 501, 502, 503, 504 and 505 is a cradle and fitted with a camera from the inside with the lenses 109 sticking out and above the surface. The mounting components 501, 502, 503, 504 and 505 make up the mounting frame 500. The mounting frame 500 includes 5 parts: the bottom and top parts which are flat bases with a ridge and three side panels. The corner mount 108 is a cone shaped addendum to the mounting frame with a female thread. In this particular embodiment the mount 108 is tilted more towards the base 504 since the normal vector of the base has a larger weight assigned and is symmetrical to the sides 501 and 503. FIG. 6 is an example of an external mounting frame that completely encloses the cameras. The rig is attached to the pole 115. The cameras in this particular embodiment are GoPro's HD Hero 960, with easy access to the SD card slots via 506 and the LCD 507. The mounting frame and the corner mount are 3D printed using PLA.

Figure 7:
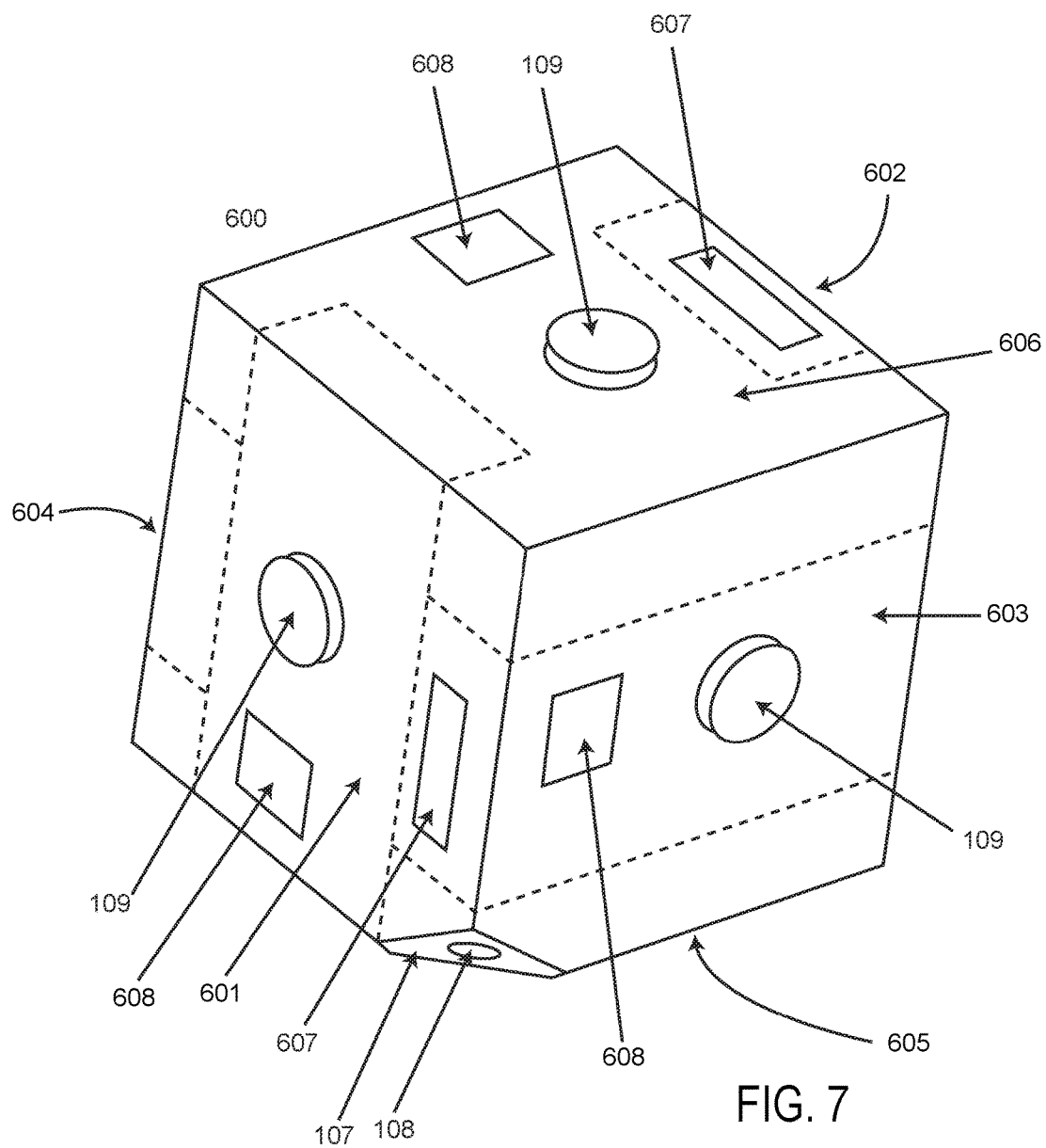
FIG. 7 is an illustration of an embodiment of the disclosed camera system where the mounting frame includes six cradles in a cube configuration and the mount is placed at a corner of the cube and pointing outward.
Figure 8:
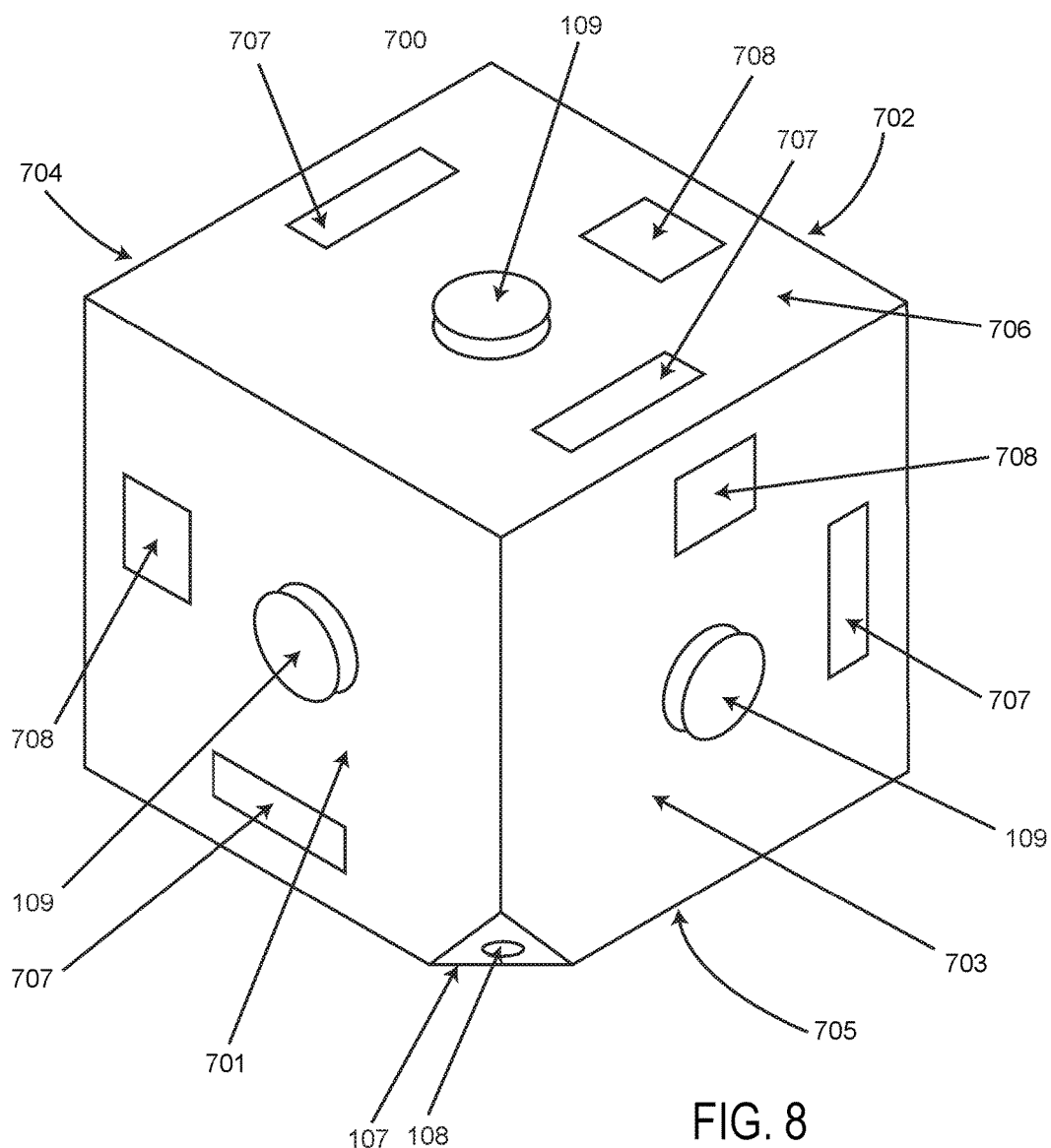
FIG. 8 is an illustration of an embodiment of the disclosed camera system where the mounting frame includes six panels in a cube configuration and the mount is placed at a corner of the cube and pointing outward.

FIGS. 7 through 11 non-limiting examples of cubic configurations of the cameras and mounting frames. FIGS. 7 and 8 are examples of an external mounting frame enclosing the cameras. In FIG. 7 the mounting components 601, 602, 603, 604, 605 and 606 may take the form of cradles holding one camera each inside the enclosure with the lenses 109 sticking out and above the surface. The cameras may be in the same orientation as in FIG. 1, for example. The mounting components 601, 602, 603, 604, 605 and 606 make up the interlocking parts of the mounting frame 600. The truncated corner 107 includes the mount which consists of a female thread tapped into the rig. The direction of the mount 108 is along the space diagonal of the cube. FIG. 6B shows the physical realization of the embodiment from FIG. 6A, a cubic configuration where the mounting frame 600 consists of 6 cradles which are the 6 mounting components 601, 602, 603, 604, 605 and 606. The rig is connected at the corner 107 to the pole 115. Access to the individual SD card slots happens via 607. The overall size, without pole, may be about 10×10×10 cm and approximately 500 gr, in a non-limiting example configuration.

Another external enclosure as the mounting frame is depicted in FIG. 8. In this particular embodiment the mounting components 701, 702, 703, 704, 705 and 706 are arranged in the same orientation as in FIG. 1. In contrast to FIG. 6A, the mounting components 701, 702, 703, 704, 705 and 706 in FIG. 8 are flat panels, without the heavy interlocking, making production and assembly easier, as well as providing better cooling to the interiors. The camera is mounted against the panels on the inside and the lenses stick out and above the panels. The mounting components 701, 702, 703, 704, 705 and 706 connect to each other along the edges and make up the mounting frame 700. In a non-limiting example, implementation, the camera mounting system or frame may be formed from white ABS, to manage internal heat during suborbital applications. However, other suitable materials may be used.

In at least some examples, the configurations of FIGS. 6, 7, and 8 may have the cameras (e.g., GoPro Hero960 and GoPro Hero2, or other suitable camera) mounted internally, with integrated wiring and electronic components, including a wireless remote control, which may make these cameras not readily user serviceable or swappable.

Figure 9:
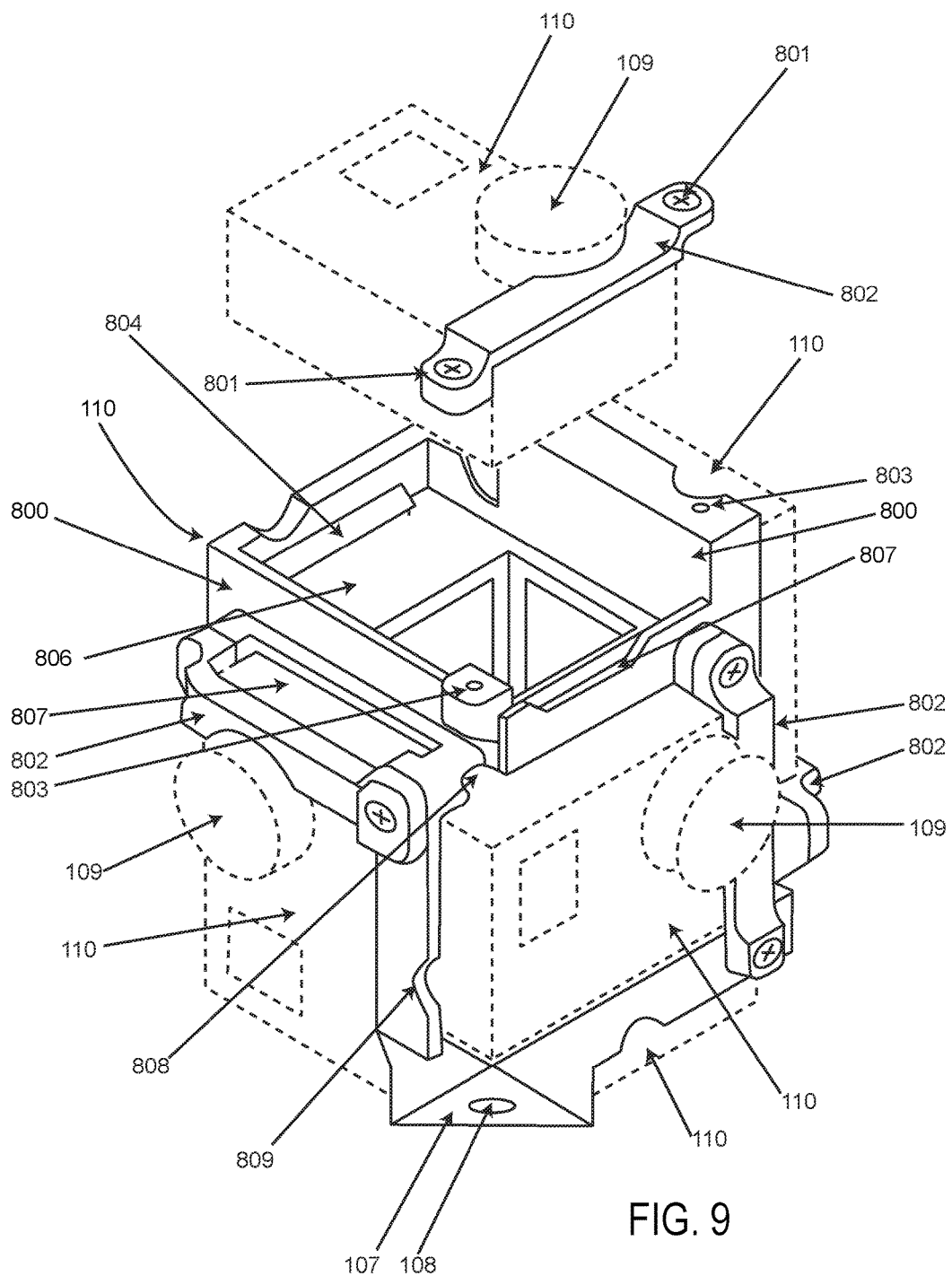
FIG. 9 is an illustration of an embodiment of the disclosed camera system where the mounting frame includes a central framework of mounting cradles in a cube configuration and the mount is placed at a corner of the cube and pointing outward.

A different approach to mounting the cameras is shown in FIG. 9. This example configuration of the disclosed camera system uses a central, common support structure 800. The individual cameras 110 are placed into cradle-like support structures 806. They may be held in place by utilizing a design feature of the cameras (GoPro Hero3) used in this example, such as the cameras, for example, having a slot on the left side, allowing the notch 804 inside each cradle to hold the camera in place on the left side. The cameras may slide into place with a diagonal motion. The right side of the camera may slide into the cradle and are restricted from moving by the side walls of the cradle. To prevent the camera 110 from popping out of the cradle, a horizontal holding brace 802 may be placed across the right side of each camera, and held in place by two screws 801, screwed into screw posts 806. Cutouts 807 within the frame allow access to the SD slot, the USB and the HDMI ports. Cutouts 808 and 809 give access to two control buttons essential in the operation of the cameras. The inside of the frame may be hollow, allowing for accessories to be used, such as external battery attachments, or a inertia measurement unit (IMU) to be plugged into the extension port on the backside of the camera, allowing it to extend into the free space inside the rig. The mounting point 108 may take the form of a metal ¼"-20 stud permanently glued or otherwise secured or integrated into the frame. The framework 800, together with the braces 802 may be printed in a fusion deposition model printer with ABS plastic, and for larger production runs on a selective-laser-sintering (SLS) printer with polyamide (Nylon). However other suitable manufacturing techniques and materials may be utilized. The cube geometry may be identical to FIG. 1, for example. In an example configuration, the overall size of the camera system is about 10×10×10 cm, and 525 gr including batteries. As a non-limiting example, the configuration of FIG. 9 may include GoPro Hero3 cameras, and the framework 800 may be 3D printed with black ABS, supported on a pole.

Figure 10:
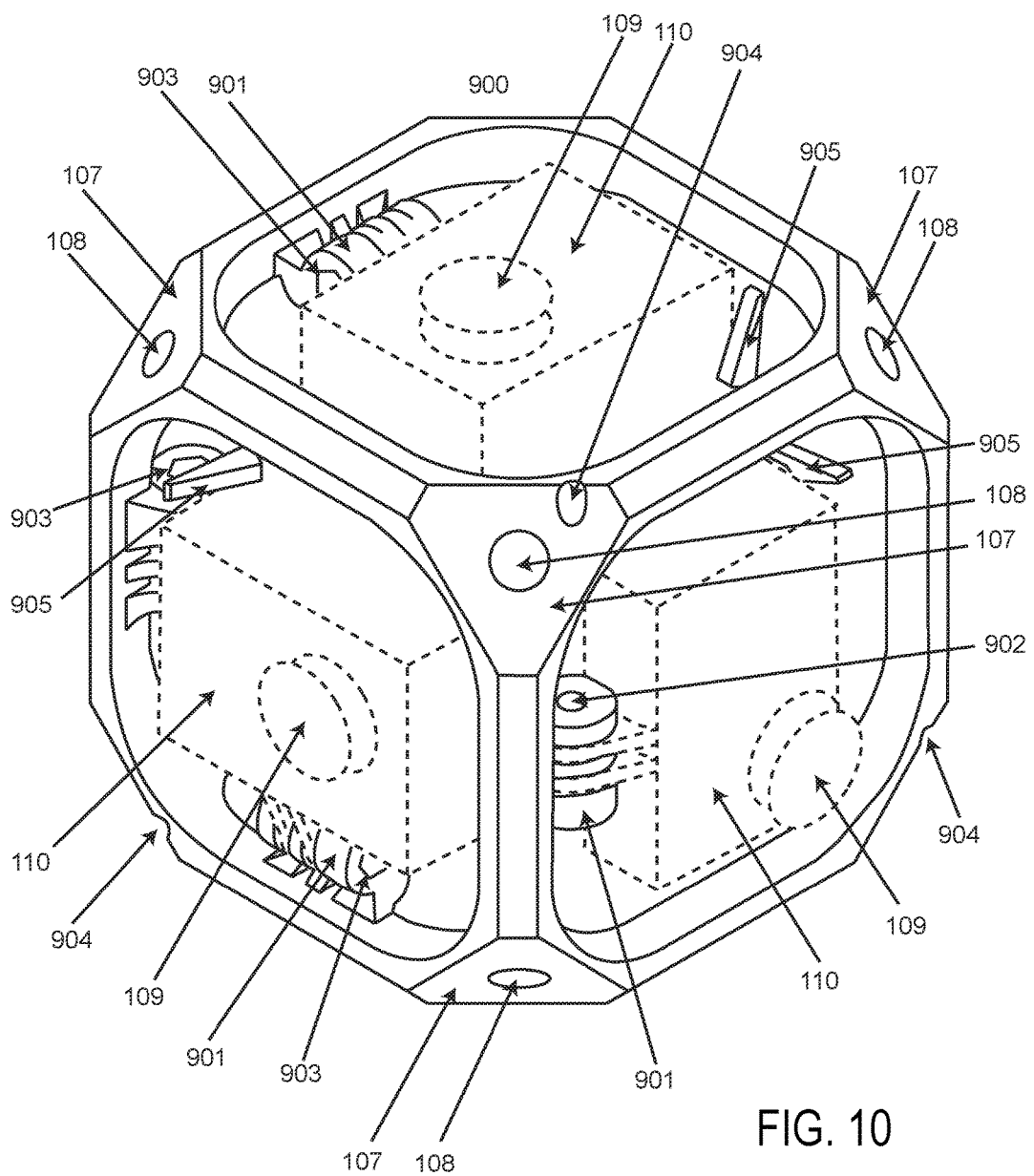
FIG. 10 is an illustration of an embodiment of the disclosed camera system where the mounting frame includes an external frame with mounting points in a cube configuration and the mount is placed at a corner of the cube and pointing outward.

FIG. 10 shows another example configurations of the disclosed camera system. In this example, the mounting frame takes the form of an external support structure. This configuration may allow the use of the water-proof housings 910 for the GoPro Hero3 or other suitable camera (e.g., including the so-called GoPro Frame Mount 911). The individual cameras 110 are mounted according to the same pattern as FIG. 1 in this example configuration.

In FIG. 10 the two prongs of 910 and 911 slide into the three prong holder 901. A stainless M5 hex cap screw 902 and a M5 Hex nut 903 clamp tight. The tool port 904 to reach the hex cap screw head may be located on the side of the frame, allowing to use a standard L-shaped hex tool to tighten and loosen the clamping screw 902. Two additional holders 905 may be used to prevent additional movement of each camera 110, since the prong-holder 901 by itself is not sufficient to keep the cameras 110 stable. In at least some configurations, holders 905 may take the form of a holding and release clip. Here, the cameras rotate (flip forward for camera changes) around a screw 901, and the clip holds them in place, even if the screw isn't completely tight.

The external frame also acts as a bump-guard in rougher shooting situations. A potential downside of this configuration is the additional lens-lens distance (e.g., about 15 cm), making the stitching process not as easy or as desirable as with the previous configurations. Additionally, the larger size and the additional weight may require a more substantial support element for filming. This configuration may be suitable to record 360 in a wet environment, like on a boat, to film surfing, or in rain, as non-limiting example. In another example the front port lens of 910 is modified to make the rig suitable for underwater recording accommodating the different refractive index of water.

Figure 11:
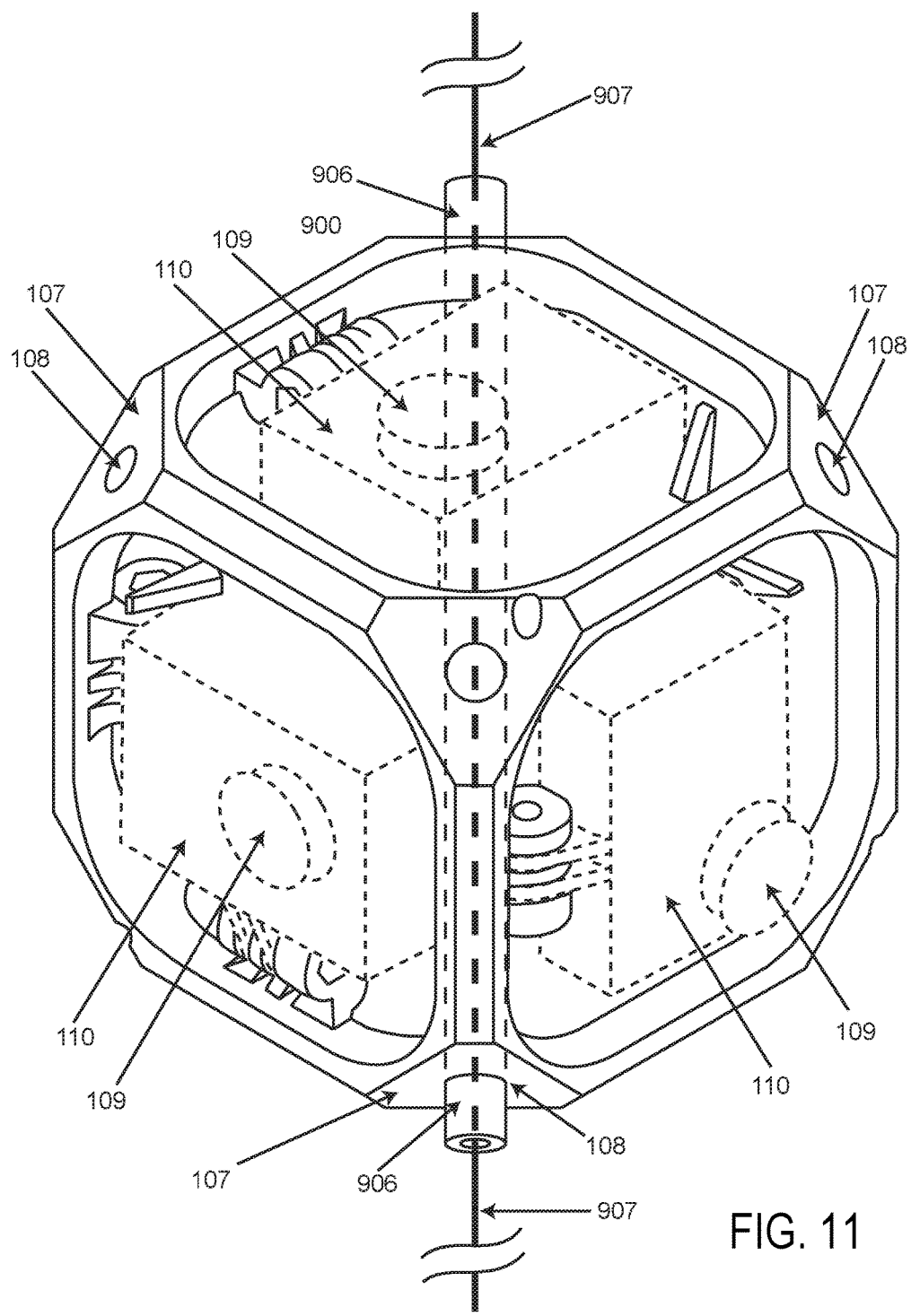
FIG. 11 is an illustration of an embodiment of the disclosed camera system where the mounting frame is supported by multiple support elements.

FIG. 11 depicts a non-limiting example of a camera system that is supported by two support elements or a support element that passes through the camera mounting system or frame. As one example, 906 may take the form of a guiding tube that is oriented diagonally from corner to corner of the frame. 907 may take the form of a guide wire, or carrying cable (taunt) upon which the entire rig can glide. It may be irrelevant to this example configuration whether the cable orientation is horizontal, vertical, or diagonal relative to a gravitational vector. Movement of the rig on a diagonal cable or a vertical cable may be gravity based or gravity assisted, with or without cable braking control on-board the camera system (e.g., friction control), for example. Horizontal, vertical, and/or diagonal cables may be used in combination with any suitable mode of locomotion, either a motorized "locomotive" directly attached to the rig moving the rig while still being in the "blind spot" or may include secondary cable (not shown—such as e.g., used with some cable cars). In at least one example configuration, a motorized locomotive may be located within the frame and behind each camera. A motorized locomotive may guide the camera system along cable 907 in either direction according to user commands. The motorized locomotive may receive user commands over a wired or wireless interface, in at least some examples. At least one of the perpendicular corners of the rig can be used to attach a short pole and/or weight, to help stabilize and reduce twist on the cable. As a non-limiting example, a ¼ in OD ⅛ in ID PTFE/teflon tube may be used for element 906, and either a 2.5 mm steel wire or dyneema rope may be used as the cable. Here, the ¼ in tube may fit into ⅜ in corner mounts.

As demonstrated by the example configurations depicted in FIGS. 6 through 11 the corner mounted camera rig is a flexible system that can be adjusted to fit various purposes while maintaining the nadir reducing or eliminating features of the disclosed camera system. The disclosed camera system is capable of providing a lightweight and compact solution to capture spherical and/or panoramic images and/or video. In one example, the small, compact size decreases or reduces parallax errors to a manageable minimum. The small size and the low weight of the system makes it incredibly versatile for the user to carry, on a monopod by hand, or for mounting to balloons, blimps or small drones or a bike handlebar, as non-limiting example. The geometry may be used to ensure full 360 by 180 spherical coverage without a nadir hole or with a reduce nadir hole, and with freedom to hold the rig in any direction/orientation. The corner mount enables the removal the physical support by masking during the stitching process resulting in an obstruction-free or obstruction-reduced images and/or video. The corner mount in conjunction with the camera mount geometry provides the user with the freedom to orient or position the rig anywhere in space. Using cameras that are completely self-contained, no additional cables, recording devices or computers are necessary.

In view of the disclosed camera system examples, it will be understood how a support element may interface with a frame of a camera mounting system at location that is defined relative to a variety of reference points or reference regions. For example, a support mount may be configured to interface with a support element or the support mount may interface directly with the frame at a location of the frame that is at or near an equidistant location from three or more respective lens centers of three or more adjacent mounted cameras of the set of cameras and/or at a location contained within a region defined by an intersection of three or more different respective field of views of three or more adjacent mounted cameras of the set of cameras. In one example, an equidistant location from three or more respective lens centers of three or more adjacent mounted cameras may refer to a distance measured from each lens center at a common angle across each of the three adjacent cameras. Here, the lens center may refer to a point on the lens or a point along an optical axis of the lens.

In at least some configurations, the camera system may include a common or shared image capture subsystem that interfaces with multiple lenses and/or optical sensors that are oriented at different respective lens orientations relative to each other to provide different respective field of views. The shared image capture subsystem used for the capture of image data from each of a plurality of lenses and/or optical sensors may include a data storage device (e.g., to store image data captured via some or all of the lenses and/or optical sensors), a logic subsystem (e.g., to process image data captured via some or all of the lenses and/or optical sensors, implement storage and/or retrieval of image data from the logic subsystem), a power source (e.g., battery) to power the shared image capture subsystem, and/or a communication subsystem to receive user commands from and/or communicate image data to a remote computing system via wired or wireless communications. The shared image capture subsystem may include respective digital pickups for each of the lenses, or the digital pickups may be integrated with the respective lenses and may provide a digital signal to the shared image capture subsystem. Hence, it will be understood that the various examples described herein with respect to separate individual cameras may be adapted for an integrated image capture subsystem having any suitable quantity of lenses and/or optical sensors. The shared image capture subsystem may be located within a frame and the lenses and/or optical sensors may point outward from the shared image capture subsystem at respective orientations.

In at least some configurations, the frame may take the form of a three-dimensional volume of any suitable shape and/or material, with a plurality of openings or windows through which the lenses and/or optical sensors image the surrounding environment. The three-dimensional volume may be sealed from the external environment to prevent water or contaminants from entering the frame. In such case, the lenses and/or optical sensors may image the surrounding environment through transparent or translucent surfaces (e.g., windows) of the frame. Within this example configurations, a shared image capture subsystem may be located with the three-dimensional volume.

In view of the disclosed camera system, it will be understood by a person having ordinary skill in the art that numerous forms of attachment or coupling may be used to secure a pole or other support element to the mounting frame at a defined orientation relative to the mounting frame and/or its camera lenses. For example, a mount may form or define a first coupling element that is adapted or configured to receive, be secured to, and/or mate with a corresponding second coupling element of the support element. The coupling elements may, for example, include male and female threaded elements, press-fits, connectors, or other suitable structures. In other examples, the support element may be integrated with the mounting frame.

The stitching techniques described herein may be implemented, at least in part, by one or more processors of a computing device executing instructions in the form of software loaded from a memory storage device. In this context, the computing device receives image information captured via a plurality of cameras, and combines the image information to obtain a composite photograph and/or video.

While the present disclosed camera system has been described in terms of particular embodiments and applications, in both summarized and detailed forms, it is not intended that these descriptions in any way limit its scope to any such embodiments and applications, and it will be understood that many substitutions, changes and variations in the described embodiments, applications and details of the method and system illustrated herein and of their operation can be made by those skilled in the art without departing from the spirit of this disclosed camera system. Variations to the disclosed embodiments that fall within the metes and bounds of the claims, now or later presented, or equivalence of such metes and bounds are intended to be embraced by the claims. It will be understood that aspects of a particular embodiment described herein may be applied to or otherwise used in combination with another of the disclosed embodiments. Hence, reference to a particular embodiment does not necessarily limit the teachings of the present disclosure to only that embodiment. Rather, such teachings may be applicable to some or all of the disclosed embodiments. The various cameras described herein may be embodied as independent or integrated lens subsystems have independent or shared digital pickup subsystems. Hence, the disclosed embodiments that reference multiple cameras may be used with an individual camera having a plurality of lens subsystems that project at different orientations relative to each other.

According to an example of the present disclosure, a camera system includes a camera mounting frame; a set of cameras containing three or more cameras mounted to the camera mounting frame at different respective lens orientations relative to each other, with each mounted camera of the set of cameras providing a different respective field of view facing outward from the camera mounting frame; and a support element coupled to the mounting frame and projecting outward from the mounting frame at an orientation that passes through an intersection of the different respective field of views of at least three adjacent mounted cameras of the set of cameras. In an example, the orientation of the support element projecting outward form the camera mounting frame passes along a weighted average of the different respective lens orientations of the at least three adjacent mounted cameras. In an example, the orientation of the support element projecting outward form the camera mounting frame passes along an unweighted average of the different respective lens orientations of the at least three adjacent mounted cameras. In an example, the camera system includes a support mount affixed to or integrated with the camera mounting frame, and coupling the camera mounting frame to the support element. In an example, the support mount is affixed to or integrated with the mounting frame at a location within a region defined by the three or more different respective lens orientations of the set of cameras. In an example, the support mount removably couples the camera mounting frame to the support element. In an example, the support mount is located at or near an equidistant location relative to respective lens centers of the at least three adjacent mounted cameras. In an example, the set of cameras includes four or more cameras. In an example, the orientation at which the support element projects outward from the mounting frame passes through the intersection of three of the different respective field of views of the at least three adjacent mounted cameras. In an example, at least a fourth camera of the set of cameras has a lens orientation pointing away from the support element and wherein a field of view of at least the fourth camera does not contain the support element. In an example, the set of cameras includes a fifth camera and a sixth camera. In an example, the fifth camera and the sixth camera each have lens orientation pointing away from the support element and respective field of views that do not contain the support element. In an example, the camera mounting frame forms a polyhedron, with each face of the polyhedron configured to hold a respective camera via a respective camera mount. In an example, each different respective lens orientation of the set of three or more cameras is orthogonal to a different respective face of the polyhedron. In an example, the support mount is located at or near a corner of the polyhedron.

According to an example of the present disclosure, a camera system includes a camera mounting frame having three or more camera mounts, each camera mount configured to hold a respective camera at a respective lens orientation such that three or more mounted cameras provide different respective lens orientations relative to each other, with each mounted camera providing a different field of view facing outward from the mounting frame; and a support mount configured to interface with a support element, the support mount affixed to or integrated with the mounting frame: at or near an equidistant location from three or more respective lens centers of three or more adjacent mounted cameras of the set of cameras, or at a location contained within a region defined by an intersection of three or more different respective field of views of three or more adjacent mounted cameras of the set of cameras. In an example, the support mount is affixed to or integrated with the mounting frame at or near the equidistant location from the three or more respective lens centers. In an example, the support mount is affixed to or integrated with the mounting frame at the location contained within the region defined by the intersection of the three or more different respective field of views of the three or more adjacent mounted cameras. In an example, the support mount is located at a weighted average or an unweighted average of the three or more different respective lens orientations. In an example, the camera mounting frame includes four or more camera mounts. In an example, at least a fourth mounted camera has a lens orientation pointing away from the support mount and wherein a field of view of at least the fourth mounted camera does not contain the support mount. In an example, the camera mounting frame forms a polyhedron, with each face of the polyhedron including a respective camera mount. In an example, each different respective lens orientation of each mounted camera is orthogonal to a different respective face of the polyhedron. In an example, the support mount is located at or near a corner of the polyhedron.

According to an example of the present disclosure, a mounting system for a plurality of cameras includes a camera mounting frame forming a polyhedron having six faces; six camera mounts affixed to or integrated with the mounting frame at or along different respective faces of the polyhedron, each camera mount configured to hold a respective camera at a respective lens orientation such that a set of six mounted cameras have six different respective lens orientations relative to each other, with each mounted camera providing a different respective field of view facing outward from the mounting frame; and a support mount affixed to or integrated with the mounting frame and configured to secure the camera mounting frame to an elongate support element that extends away from the support mount at a defined orientation such that the elongate support element extends through a region defined by an intersection of three different field of views of three mounted cameras. In an example, three other mounted cameras of the set have different respective lens orientations pointing away from the elongate support element and different respective field of views that do not contain the support mount or the elongate support element. In an example, the support mount is affixed to or integrated with the mounting frame at a corner of the polyhedron shared by a plurality of faces of the polyhedron.

The invention claimed is:

1. A spherical camera system, comprising:
   at least one camera including one or more optical sensors to capture image data;
   at least six camera lenses interfacing with the one or more optical sensors;
   a camera mounting frame forming a three-dimensional volume having one or more exterior surfaces surrounding the at least one camera contained therein and defining, within the one or more exterior surfaces of the three-dimensional volume, at least six lens openings within which the at least six camera lenses are disposed, the camera mounting frame supporting the six camera lenses facing outward from the three-dimensional volume at different respective lens orientations to collectively capture a full visual sphere surrounding the camera mounting frame without a nadir hole,
   the camera mounting frame including a support mount forming a threaded female receptacle within an exterior surface of the one or more exterior surfaces of the three-dimensional volume within a region defined by at least three neighboring camera lenses of the at least six camera lenses or their respective lens openings, the support mount being equidistant from respective lens centers of the three neighboring camera lenses.

2. The spherical camera system of claim 1, wherein the at least one camera includes six cameras that correspond to the at least six camera lenses.

3. The spherical camera system of claim 1, wherein the three-dimensional volume of the camera mounting frame has a spherical or ovoid configuration.

4. The spherical camera system of claim 1, wherein the three-dimensional volume of the camera mounting frame has a polyhedron configuration.

5. The spherical camera system of claim 4, wherein the polyhedron includes at least six faces, and wherein each of the six faces of the polyhedron defines a respective lens opening for a respective camera lens of the six camera lenses.

6. The spherical camera system of claim 1, further comprising:
   an elongate support element projecting outward from the camera mounting frame at an orientation that passes through an overlap region of three field of views of the three neighboring camera lenses when secured to the camera mounting frame via the threaded female receptacle and a corresponding male threaded element of the elongate support element.

7. The spherical camera system of claim 1, wherein the threaded female receptacle has an orientation that passes along an average of three camera lens orientations of the three neighboring camera lenses.

8. The spherical camera system of claim 1, wherein the support mount is located within the region defined by more than three neighboring camera lenses of the at least six camera lenses, the support mount being equidistant from respective lens centers of the more than three neighboring camera lenses.

9. A spherical camera system, comprising:
   a camera mounting frame forming a three-dimensional volume having one or more exterior surfaces forming a spherical or ovoid configuration and defining, within the one or more exterior surfaces, at least six external lens openings facing outward from a center of the camera mounting frame at different respective orientations, and further including a support mount forming a threaded female receptacle within an exterior surface of the one or more exterior surfaces that is located within a region defined by at least three neighboring external lens openings of the at least six lens openings;
   at least six camera lenses mounted on the camera mounting frame and disposed within or projecting outward through the at least six external lens openings to collectively capture a full visual sphere surrounding the camera mounting frame without a nadir hole, wherein lens centers of three neighboring camera lenses of the at least six camera lenses or their three corresponding lens openings are equidistant from the support mount; and at least one camera including one or more optical sensors mounted to the camera mounting frame within and surrounded by the one or more exterior surfaces of the three-dimensional volume to capture image data via the at least six camera lenses.

10. The spherical camera system of claim 9, further comprising an elongate support element that interfaces with the support mount and projects outward from the camera mounting frame at an orientation that passes through an overlap region of three field of views of the three neighboring camera lenses.

11. The spherical camera system of claim 9, further comprising an elongate support element that interfaces with the support mount and projects outward from the camera mounting frame at an orientation that passes along an average of three camera lens orientations of the three neighboring camera lenses.

12. The spherical camera system of claim 9, further comprising at least six cameras associated with the six camera lenses;

wherein the six cameras are mounted to the camera mounting frame within and surrounded by one or more exterior surfaces of the three-dimensional volume.

13. The spherical camera system of claim 9, wherein the support mount is located within the region defined by more than three neighboring camera lenses of the at least six camera lenses, the support mount being equidistant from respective lens centers of the more than three neighboring camera lenses or their corresponding lens openings.

* * * * *